Patented Apr. 5, 1932

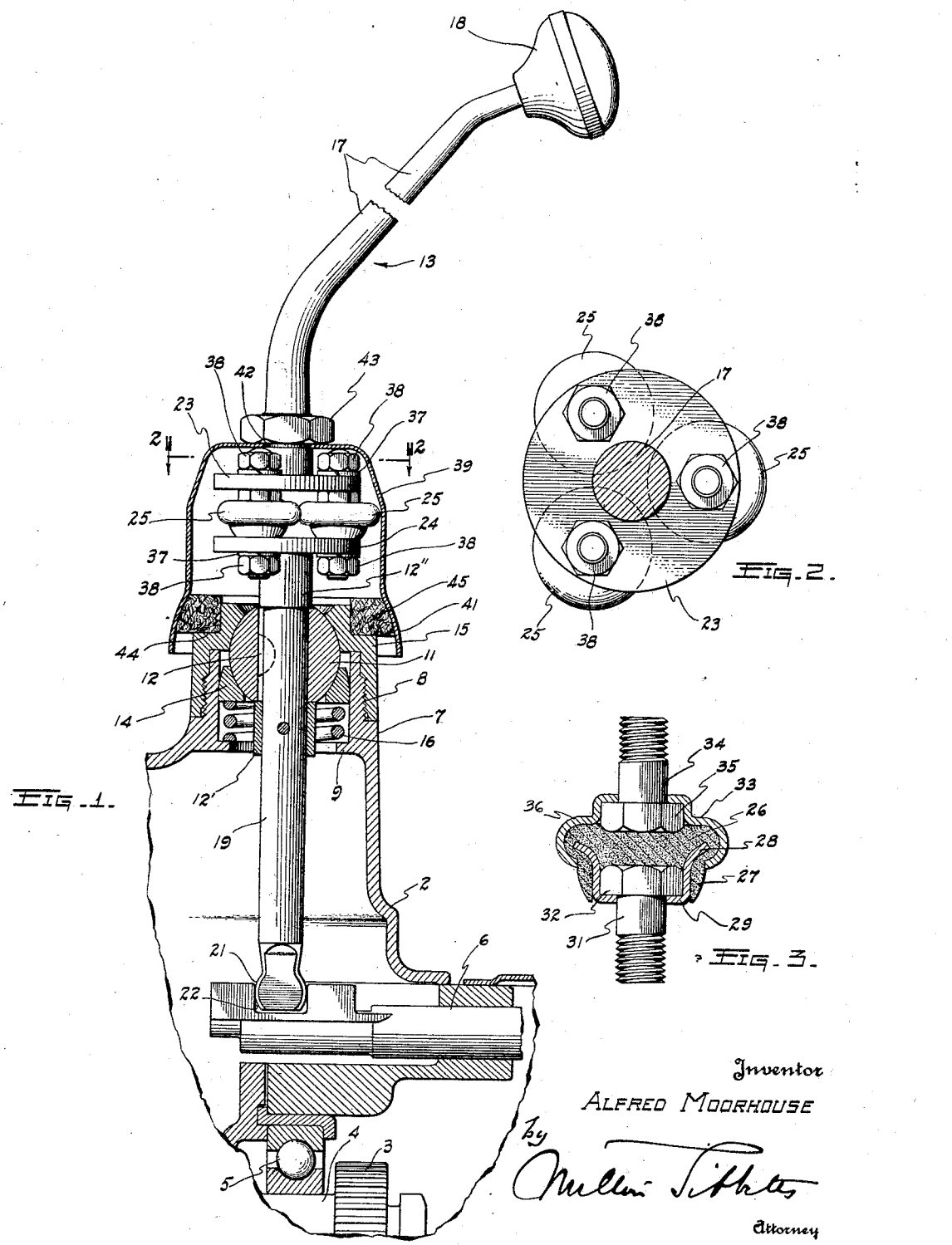

1,852,979

UNITED STATES PATENT OFFICE

ALFRED MOORHOUSE, OF DETROIT, MICHIGAN, ASSIGNOR TO PACKARD MOTOR CAR COMPANY, OF DETROIT, MICHIGAN, A CORPORATION OF MICHIGAN

CHANGE SPEED LEVER

Application filed December 9, 1929. Serial No. 412,588.

This invention relates to change speed or gear shift levers for automobiles, tractors, motor boats and the like. The invention, for convenience of illustration and description will be disclosed in connection with and in a form particularly adapted for automobiles, but its uses and advantages in other connections will or should clearly appear.

It has been found that gear shift or change speed levers frequently vibrate under certain conditions, as when the automobile is being driven in low or in an intermediate gear at high engine speed, or, as when gears or other parts become worn or damaged sufficiently to set up a vibration directly transmitted to the change speed lever. There may be other causes, but whatever the cause, the result is a vibrating change speed lever which may or may not cause noises, but which, in any event is annoying and undesirable. Where these effects are due to worn or damaged parts, the repair or replacement or adjustment of such parts sometimes reduces or minimizes the vibration (often this is merely a temporary remedy), but where the vibration primarily arises when the engine is running at relatively high speed with the car in low or intermediate gear and cannot be charged to worn or defective parts, it is difficult if not impossible to remedy the situation by ordinary means.

One of the important objects of the invention, therefore, is to provide an arrangement whereby vibrations, whatever their cause, tended to be transmitted to the change speed lever, at least to the upper parts thereof where vibrational effects are greatest in amplitude because of the long leverage, will be minimized or damped or absorbed and any noise, which might otherwise result, will be avoided. In this connection it may be remarked that resilient damping means is so employed that while the vibrations, whenever they occur or tend to occur, are effectively absorbed, there is no appreciable interference with proper functioning of the shift lever.

Another important object is to provide a simple but effective casing or enclosure for the vibration absorbing or damping elements and their associated structure, not only to prevent injury to such mechanism but also to prevent dirt and grease from accumulating in a place where it might soil the clothing or be otherwise objectionable to a passenger in the vehicle.

Many further objects as well as the advantages, uses and purposes of the invention will be or should become fully appreciated and understood after reading the following description and claims and after viewing the drawings in which:

Fig. 1 is a side elevational view of a gear shift lever mounted in the transmission housing or case of an automobile or the like, with parts shown in section, illustrating one embodiment of the invention.

Fig. 2 is an enlarged sectional view taken substantially along the line 2—2 of Fig. 1 looking in the direction of the arrows, and Fig. 3 is a sectional view in detail of one of the damping elements utilized in the preferred embodiment.

The invention has been illustrated in connection with the transmission housing of a well known type of automobile. The transmission housing 2 encloses a selective speed transmission including first or low and intermediate gears (not shown), a constant mesh gear 3 mounted on a shaft 4 for driving the countershaft and which is mounted in suitable bearings including that generally designated 5, and gear shifter fork shafts 6 (one only shown). In a suitable place the housing 2 is provided with a hollow boss 7 the top portion of which is externally shouldered and threaded as shown at 8 and the interior bottom portion of which is provided with a circumferentially extending, internally projecting flange 9.

The boss 7 is adapted to receive a ball or other pivot member 11 which is secured, as by a key 12 between a pinned collar 12' and a shoulder 12'' to the gear shift lever generally designated 13 and which is carried by and between a bearing member 14 slidably mounted in the bore of the boss and a bearing cap 15 which is threadedly engaged with the threads 8 of the boss. The bearing member 14 is adapted to slide up and down within the bore of the boss as occasion may demand but is resiliently pressed against the ball 11 by a coiled spring 16 which at one end bears against the bearing member 14 and at its other end against the abutment 9. This arrangement not only takes up any play between the ball and its bearing members but because of the friction imposed tends to hold the shift or change speed lever in adjusted position.

For the purposes of the preferred embodiment of the invention the gear shift or change speed lever 13 is divided into two parts, an upper part or rod 17 to the upper portion or end of which a handle or hand grip 18 is attached, and a lower part or rod 19 to which the ball 11 is secured. The lower end of the rod 19 is provided with spherical bearing surfaces 21 which are adapted to be received and work within recesses or slots 22 formed in portions of the gear shifter fork shafts 6, whereby selectively to actuate these shafts 6 to effect a change of gearing and thus a change of speed. The rod 17 and the rod 19, since they are complementary parts of the gear shift lever as a whole and may be referred to as the operating portion and the operated portion, respectively, of such lever, have their intermediate or adjacent ends secured together through a vibration damping and shock absorbing device. This device may include, as illustrated, a disk or abutment member 23 of rigid or substantially rigid material rigidly or substantially rigidly secured in any suitable manner to the lower or intermediate end of the rod 17, a similar disk 24 similarly secured to the upper or intermediate end of the rod 19 and a plurality of damping elements generally designated 25 each of which is secured to both disks 23 and 24.

While the damping elements, which are sometimes referred to as "biscuits", may be purchased upon the open market and per se do not form part of the invention, for convenient reference a description of them hereinmay be desirable. Each consists of a circular, resilient rubber pad 26 formed with a flange 27 to provide a circular recess within which the circular flange 28 of a sheet metal clamping member 29 is received. The clamping member 29 is provided with a central circular aperture through which the shank 31 of a bolt is passed with the head 32 of the bolt disposed within the cup of the clamping member, that is, with the head of the bolt abutting against one side of the rubber pad. A cooperative clamping member 33 of sheet metal is similarly apertured to receive the shank 34 of another bolt having its head 35 within the cup of the clamping member and has a flange 36 which, after the parts are in assembled relationship, is spun down to the position illustrated in Fig. 3 to clamp the rubber flange 27 tightly against the flange 28 of the cooperative clamping member. The rubber is held under a certain amount of compression between the clamps and bolt heads and although the assembly affords a shock and vibration absorbing element, there being no metallic continuity, the parts are firmly secured together and are sufficiently rigid when used in multiple to permit the change speed lever to function properly.

As intimated above, damping elements of the character illustrated have not been found sufficiently rigid for proper functioning of the speed lever when used singly and while two of these elements might be sufficient under some circumstances, I prefer to use three arranged at the apices of an equilateral triangle. This arrangement is clearly illustrated in Figs. 1 and 2 from which it will be apparent that the disks or flanged abutments 23 have alined apertures adapted to receive the threaded shanks of the axially alined bolts of the elements 25. The bolts 32 and 35 may have their heads suitably interlocked with the clamping elements 29 and 33, respectively, so that relative rotation between the bolts and the clamping elements will be avoided and when their shanks are disposed through the corresponding apertures, lockwashers and nuts 37 and 38, respectively, are used to secure them to the disks 23 and 24. Since the only connection between the rods 17 and 19 constituting the change speed or gear shift lever is through the damping elements or pads 26, any vibration arising in the transmission case or transmission or elsewhere tended to be transmitted through the change speed lever to the handle 18, will be effectively damped and absorbed. On the other hand the connection between the rods is sufficiently rigid to permit gear shifting movements of the handle and upper portion of the lever to be transmitted in the proper functional manner to the lower portion or rod 19 and thence to the gear shifter fork shafts.

It is preferable in the embodiment illustrated that the connection between the upper and lower rods forming the change speed lever be located above the pivot or ball 11, but this might be open to obvious objections. Consequently, I have devised a casing or enclosure for the connection including the elements. A sheet metal stamping 39 having a depending skirt or flange 41 and of cup shape is provided with an aperture 42 adapted to receive the lever rod 17 before the handle 18 is put in place. An upwardly facing shoulder on the rod 17 or a shoulder formed by the flanged member or disk 23 serves as a limiting abutment for the casing which is secured thereagainst by a nut 43 threadedly engaged with threads formed on the rod 17. It is important that shifting or rocking movements of the shift lever do not cause the skirt 41 or any other part of the casing 39 to contact with the housing 2 or the bearing member 15 because to permit it to do so would be to thwart in part at least one of the objects of the invention. In order to prevent this metal to metal contact, the bearing member 15 is provided with a circumferential recess or shoulder 44 within which a rubber or other resilient material ring or gasket 45 is placed. This does not interfere with proper functioning of the gear shift or change speed lever and also provides a substantially grease and dust tight joint.

While the invention has been illustrated and described in a preferred form for a particular embodiment, it will be appreciated that many changes and modifications may be made therein and that it is susceptible of use in many other ways bearing little, if any, physical resemblance to that disclosed herein. Therefore, I wish to be limited only by the spirit of the invention and the scope of the appended claims.

I claim:

1. A change speed lever comprising, a rod divided intermediate its extreme ends and providing a handle portion and a shifter mechanism engaging portion, said portions at their intermediate ends being spaced apart and in substantial alignment, a flanged member secured to each portion adjacent its said intermediate end, and a plurality of vibration damping elements connecting said flanged members and said portions together in operatively rigid relationship.

2. A change speed lever comprising, a rod providing a handle at one end, a second rod for connection with the first said rod at one end and with gear shifting mechanism at its other end, and a coupling connecting said rods comprising, a rigid abutments member rigidly secured to each rod and resilient pads disposed in spaced relation to one another between said abutments and each secured to both of said abutments.

3. A change speed lever comprising, a rod providing a handle at one end, a second rod adapted at one end to be connected to and form a continuation of the first said rod and to be engaged with a gear shifting mechanism at its other end, an abutment member secured to each rod adjacent its end to be connected to the other, and means including resilient pads connected to and between said abutments, said pads and their connections providing a coupling sufficiently rigid to transmit positive shifting movements of the first rod to the second rod while being sufficiently resilient to absorb vibrations tended to be transmitted from one rod to the other.

4. A change speed lever comprising, a rod providing a handle at one end, a second rod adapted at one end to be connected to and form a continuation of the first said rod and at its other end to be engaged with a gear shifting mechanism, a metal disk secured to each rod at its end to be connected to the other, and means including rubber pads connected to and between said disks, said pads and their connections providing a coupling sufficiently rigid to transmit positive shifting movements of the first rod to the second rod while being sufficiently resilient to absorb vibrations tended to be transmitted through one rod to the other.

5. In a change speed mechanism including gearing and a housing therefor, a pivotally mounted shifting rod passing through said housing with one end operatively connected with the gearing and its other end exterior of said housing, a second rod having an operating handle at one end, a vibration damping connection between the other end of the second rod and the exterior end of the first rod, and a casing covering said damping connection.

6. In a change speed mechanism including gearing and a housing therefor, said housing having a boss, a shifting rod pivotally mounted in said boss and having one end projecting exteriorly thereof, a complementary rod having an operating handle at one end, a vibration damping connection between the exterior end of the first said rod and the second said rod, a casing about said damping connection, secured to the second said rod and depending over said boss, and a non-metallic resilient member between said casing and said boss.

7. In a change speed device, an operating lever having an operating portion and an operated portion and a plurality of damping means, parallel to and spaced from the longitudinal axis of the operating lever, interposed between said portions.

8. A lever comprising an operating portion and an operated portion, and a plurality of damping devices connecting said portions, said damping devices being arranged in parallel relation and spaced from the longitudinal axis of the lever.

9. In a lever means, the combination of a support, a second lever part having a free end adapted for manual operation, and a plurality of rubber damping devices connecting said lever parts, said damping device being arranged in parallel relation and spaced from the longitudinal axis of the lever.

10. In a change speed device, a two-part lever, one of said parts engaging a gear shifting element, means for mounting said part at a point between its ends and arranged so that the part may have a substantially universal but limited movement, the other of said parts having a handle for manual operation, and rubber damping means connecting the two lever parts for positive shifting movements while absorbing gear vibrations, said connecting means being adjacent to but beyond the point of mounting of the first of said lever parts.

11. In a lever means, the combination of a support, a lever part pivotally mounted in said support and connected to actuate a mechanism, there being only a short portion of said lever part extending beyond the support opposite the actuating portion of said part, a second lever part having a free end for manual operation and an end for connection to the first lever part at said short portion, and rubber damping means connecting said short portion of the first lever part to the connection end of the second lever part, said rubber damping means providing positive shifting movements while preventing transmission of vibrations to the second lever part.

12. In a lever means, a two-part lever having adjoining ends and free ends, the free end of one part being connected to actuate a mechanism and the free end of the other part having a hand grip for manual operation of the lever, rubber damping means connecting the lever parts for positive shifting movements while preventing transmission of vibrations from one part of the lever to the other, and mounting means for said lever providing a pivotal support at a point on said lever between said actuating end and the interconnecting means and adjacent the latter.

In witness of the foregoing I affix my signature.

ALFRED MOORHOUSE.